United States Patent [19]

Fagerburg et al.

[11] Patent Number: 4,952,671
[45] Date of Patent: * Aug. 28, 1990

[54] TERMINATED COPOLY(ARYLENE SULFIDE)

[75] Inventors: David R. Fagerburg; Joseph J. Watkins, both of Kingsport; Paul B. Lawrence, Blountville; Mark Rule, Kingsport, all of Tenn.

[73] Assignee: Eastman Kodak Company, Rochester, N.Y.

[*] Notice: The portion of the term of this patent subsequent to Nov. 6, 2004 has been disclaimed.

[21] Appl. No.: 219,123

[22] Filed: Jul. 15, 1988

[51] Int. Cl.$^5$ .............................................. C08G 75/14
[52] U.S. Cl. ................... 528/226; 528/389; 528/388; 525/537
[58] Field of Search ................ 525/537; 528/388, 389, 528/226

[56] References Cited

U.S. PATENT DOCUMENTS

| | | |
|---|---|---|
| 2,513,188 | 7/1950 | Macallum . |
| 2,538,941 | 1/1951 | Macallum . |
| 3,285,882 | 11/1966 | Pike . |
| 4,046,749 | 9/1977 | Hawkins . |
| 4,495,332 | 1/1985 | Shiiki et al. ..................... 528/388 |
| 4,605,732 | 8/1986 | Heitz et al. ...................... 525/537 |
| 4,645,825 | 2/1987 | Idel et al. . |
| 4,645,826 | 2/1987 | Iizuka et al. . |
| 4,786,713 | 11/1988 | Rule et al. ....................... 528/388 |

FOREIGN PATENT DOCUMENTS

| | | |
|---|---|---|
| 0214470 | 3/1987 | European Pat. Off. . |
| 0238193 | 9/1987 | European Pat. Off. . |
| 3529498 | 2/1987 | Fed. Rep. of Germany ...... 528/388 |

*Primary Examiner*—John C. Bleutge
*Assistant Examiner*—David W. Woodward
*Attorney, Agent, or Firm*—Charles R. Martin; William P. Heath, Jr.

[57] ABSTRACT

A copoly(arylene sulfide) corresponding to the structure

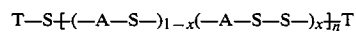

$$T-S+(-A-S-)_{1-x}(-A-S-S-)_x]_n T$$

wherein A is a divalent substituted or unsubstituted aromatic radical, T is a monovalent aromatic radical, x is n the range of 0.5 t 0.001 and n is at least 100.

7 Claims, No Drawings

TERMINATED COPOLY(ARYLENE SULFIDE)

The invention relates to a terminated copoly(arylene sulfide) prepared by heating a diiodo aromatic compound and a small amount of a monoiodo aromatic compound in the presence of elemental sulphur. The monoiodo compound acts as a chain terminator.

Poly(arylene sulfide) (PAS) resins are thermoplastic polymeric materials with good thermal stability, unusual insolubility, resistance to chemical environments and inherent flame resistance. PAS resins additionally have good electrical insulative Properties which make them ideal for electrical and electonic applications. Their excellent resistance to chemical degradation makes them ideal for use in chemical environments which involve organic solvents and strong mineral acids, such as coatings for Pipes, tanks, pumps and other equipment.

Poly(phenylene sulfide) (PPS) is a commerical product which is generally produced by reacting p-dichlorobenzene with sodium sulfide in a polar organic solvent to produce PPS and the by-product sodium chloride. This Process is known as the Edmonds-Hill polymerization procedure and the basic process is disclosed in U.S. 2,513,188 and U.S. 2,538,941. An improvement on the Edmonds-Hill polymerization procedure involves adding N-haloamides as catalysts in the Procedure (U.S. 3,285,882). The Edmonds-Hill Polymerization utilizes only chloroaromatic compounds.

The PPS which is formed in the Edmonds-Hill process has only a modest molecular weight on the order of 10,000–40,000 and has relatively low melt viscosity. Higher molecular weights can be obtained by heating the PPS in the presence of oxygen. During heating, the molecular weight of the PPS increases due to a variety of chemical reactions including oxidation, crosslinking and chain extension. These curing reactions result in polymers which have inherent brittleness and reduced drawing capability while only achieving modest increases in molecular weight. Additionally, PPS which is produced by polymerization in the presence of sulfide and/or hydrosulfide salts, such as sodium sulfide and sodium hydrosulfide, has a residual content of inorganic salt present in the polymer. These residual salts are, for example, sodium chloride and sodium sulfide resulting from the combination of the sodium cation with chlorine or sulfide from the starting materials. The presence of these residual salts in the polymer increases the corrosive nature of the polymer and can cause a deterioration in the drawing or spinning characteristics of the polymer. Residual salts can also result in breakages in the sPun fibers and additionally contribute to plugging and clogging of the spinnert holes.

An additional Problem with poly(arylene sulfide) produced by the Edmonds-Hill Process is the effect of residual salts on the electrical properties. The presence of residual salts results in polymers with increased moisture adsorption and electrical activity, which are detrimental to applications requiring highly insulating characteristics. Although extensive extraction reduces the salt content of PPS produced by the Edmonds-Hill process, complete removal of these salts is commercially infeasible.

An additional problem with PPS produced by the Edmonds-Hill Process is the high rate of crystallization of these Polymers. Although some applications do require high rates of crystallization, many aPPlications require much slower rates of crystallization. These polymers contain no substantial quantities of disulfide units.

U.S. 4,645,826 discloses a process of preparing "ultra-high molecular weight" linear PAS by first preparing a prepolymer with a melt viscosity between 5,000–3,000 poise and then preforming a liquid-liquid two-phase polymerization. Only dichloroaromatic compounds are disclosed and the prepolymer is formed using a conventional alkaline metal sulfide. The "ultra-high molecular weight" polymers have melt viscosities of only tens of thousands of Poise. The prepolymer is formed by a standard Edmonds-Hill polymerization in the presence of an alkali metal sulfide. Accordingly, the Polymers Produced will suffer from the problems associated with residual salt content noted above. These polymers are also thought to contain no substantial quantities of disulfide units.

U.S. 4,645,825 also discloses poly(arylene sulfide) produced using dichloroaromatic or dibromoaromatic compounds and polymerizing in the presence of conventional alkaline metal sulfides or hydrosulfides. Although Polymers with relatively high molecular weights and melt viscosities can be produced by this process, the presence of residual inorganic salts in the polymer results in inferior corrosion characteristics as well as poorer spinning and drawing capability. These polymers are also thought to have no substantial quantities of disulfide units.

Serial Number 110,237, now abandoned, discloses a polymer similar to the polymer of this invention except that the polymer disclosed in this application is not terminated.

We have now discovered a terminated copoly(arylene sulfide) which is similar to the unterminated polymer disclosed in Serial Number 110,237 in that the polymer does not contain substantial quantities of alkali metals and has an adjustable rate of crystallization but is an improvement over the unterminated polymer due to a more stable melt viscosity and improved melted corrosion properties.

The terminated copolymers of this invention do not contain substantial quantity of alkali metals simply because no alkali metal is used in the process used to Prepare the polymer. Although Applicants do not wish to be limited to any particular theory, it is believed that the variable rate of crystallization of the terminated copolymer is due to the presence of small amounts of (—A—S—S—) or disulfide units in the polymer chain. Thus, these polymers can be considered to be copolymers. The presence of these disulfide units in the copolymer do not materially affect other imPortant proPerties of the polymer, such as glass transition temperature, solvent resistance, thermal stability, and oxidative stability.

The vast majority of rePeating units in the terminated copolymer of this invention are the (—A—S—) unit and the number of (—A—S—S—) or disulfied units are small comPared to the number of (—A—S—) units Generally, the fraction of (—A—S—S—) units is in the range of 0.5 to 0.001, based on the combined number of both (—A—S—) and (—A—S—S—) units. Thus, the rePeating Portion of the copolymer can be represented as (—A—S—)$_{1-x}$(—A—S—S—) where x is in the
range of 0.5 to 0.001. The sequence of (—A—S—)
and (—A—S—S—) units is thought to be random
throughout the molecular chain. When x is in the
range of 0.5 to 0.2 the Polymers obtained when a is p-phenylene are amorphorus and can be crystallized only with difficulty. When x is in the range of 0.2 to 0.1 the Polymers obtained can be thermally crystallized and have crystlline melting points of 230°–260° C. When x is in the range of 0.1 to 0.05 the polymers obtained have moderate crystallization rates and the crystallized polymers can be annealed to high crystalline melting points (280°–290° C.) and show Tcc (temPerature of crystallization on heating) and Tcc (temperature of crystallization on cooling) at increasingly lower and higher temperatures, respectively, indicative of increasing rates of crystallization. When x is in the range of 0.05 to 0.001 the crystallization rate increases raPidly with decreasing x.

The following table more clearly shows the effect of disulfide units on the crystallization rate of poly(phenylene sulfide):

| X | Tg | Tcc | Tch | Tm | T ½ (130° C.) |
|---|---|---|---|---|---|
| 0.25 | 88 | — | — | 238 | |
| 0.14 | 90 | — | — | 251 | |
| 0.12 | 94 | — | — | 255 | 132 Seconds |
| 0.10 | 92 | 168 | — | 243 | |
| 0.064 | 94 | 142 | 231 | 280 | |
| 0.055 | 95 | 140 | 226 | 278 | |
| 0.049 | 95 | 126 | 240 | 280 | |
| 0.000 | 91 | 126 | 242 | ·278 | 12 Seconds |

The size of the polymer chain can conveniently be exPressed as the total number of each kind of unit in the chain. Therefore, the rePeating Portion of the terminated copoly(arylene sulfide) of this invention can be more sPecifically expressed as corresponding to the structure

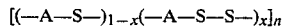
$$[(-A-S-)_{1-x}(-A-S-S-)_x]_n$$

wherein n, the degree of polymerization, is at least 100 and is Preferably in the range of 200 to 5,000 as determined by melt viscosity measurement at 300° C. The degree of polymerization when A is p phenylene can be calculated using the relationship $\log(n) = 1.473 + 0.2873 \times \log(\text{melt viscosity})$ where melt viscosity is measured in poise.

In accordance with this invention the copoly(arylene sulfide) is terminated with a monovalent radical contributed from a monoiodo aromatic comPound to form a Polymer corresponding to the structure

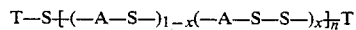
$$T-S-[(-A-S-)_{1-x}(-A-S-S-)_x]_{\overline{n}}T$$

wherein A is an unsubstituted aromatic radical, T is a monovalent aromatic radical, x is in the range of 0.5 to 0.001 and n is at least 100.

In the process used to prepare the terminated copoly(arylene sulfide) of this invention a diiodoarylene compound corresPonding to the structure

$$I-A-I$$

where A is a divalent arylene radical is reacted with the monoiodo aromatic compound and elemental sulfur to produce a substantially linear terminated copoly(arylene sulfide) having both (—A—S—) units and (—A—S—S—) units.

Diiodoaromatic compounds which can be utilized include unsubstituted or substituted aromatics which have two iodine substituents. Suitable diiodo aromatic compounds include hydrocarbon aromatics, nitrogen-containing aromatics, sulfur-containing aromatics and oxygen-containing aromatics. Typical hydrocarbon aromatics include benzene and biphenyl, and condensed ring aromatics such as naphthalene and anthracene. Typical sulfur-containing aromatics include, for examPle, thiophene and benzothiophene. Typical nitrogen-containing aromatics include pyridine and quinoline. Suitable oxygen-containing aromatics are, for examPle, furan, dibenzofuran, etc. Substituted diiodo aromatic comPounds suitable for use with the Present invention include aromatic sulfones, diarylethers, diarylcarbonyls. diarylsulfides and the like.

The aromatic starting materials may be substitued by one or more alkyl grouPs, preferably alkyl groups having from 1-6 carbon atoms. Specially preferred alkyl grouPs are methyl, ethyl, ProPyl and butyl groups. There is no limitation on the spatial arrangement of the substituents, for example, the substituents may be on a carbon adjacent to an iodine bearing carbon or may be on a carbon atom further removed from the iodine bearing carbon.

Additionaly substituents on the aromatics compounds may include Phenyl, halogen, hydroxy, nitro, amino, $C_{1-6}$ alkoxy, and carboxylate esters substituents, as well as aryl sulfones and aryl ketones.

Preferred diiodo aromatic comPounds are the diiodobenzenes, diiodonaphthalenes, diiodobiphenyls, diiododiPhenyl ethers and diiodotoluenes which may be unsubstituted or substituted with any of the substituents noted above.

Specific diodo aromatic compound suitable for the present invention include p-diiodobenzene, m-diiodobenzene, p,p'-diiodobiophenyltion m,p'-diiodobiphenyl, p,p'-diiododiPhenyl sulfone, p,p'-diiododiphenyl ether, 2,6 diiodonaphthalene, and p,p'-diiodobenzophenone. p-Diiodobenzene, p,p'-diiodobiPhenyl, and p,p'-diiododiPhenyl ether are most preferred.

The diiodo aromatic starting materials of the present invention may be prePared by any suitable process. For example, the diiodo aromatic compounds may be PrePared by standard liquid or gas phase iodination reactions. Although the diiodo aromatic compounds may be prepared by any such process, the preferred method of prePäring the diiodo aromatic starting materials is that disclosed in copending application serial numbers 912,806 filed Sep. 29, 1986, now U.S. Pat. No. 4,746,758; 026,896, filed Mar. 17, 1987, now U.S. Pat. No. 4,861,904; 029,959, filed Mar. 25, 1987, now U.S. Pat. No. 4,795,737, and 029,898, filed Mar. 25, 1987, now U.S. Pat. No. 4,792,642. Alternatively, the diiodo aromatic compounds may be produced by a transiodination process such as that disclosed in copending application serial numbers 029,899, filed Mar. 25, 1987, now U.S. Pat. No. 4,792,641, filed Mar. 25, 1987, now U.S. Pat. No. 4,806,698; and 029,949, filed Mar. 25, 1987, now U.S. Pat. No. 4,806,397. The disclosures of these copending applications are incorPorated herein by reference for a more comPlete description of these preferred processes.

Although broadly any monoiodo aromatic compound can be used to contribute the terminating radical T, it is Preferable that the boiling point of the compound be above 200° C. at atmospheric pressure and more Preferable that the boiling Point be above 230° C. Preferred monovalent radicals are

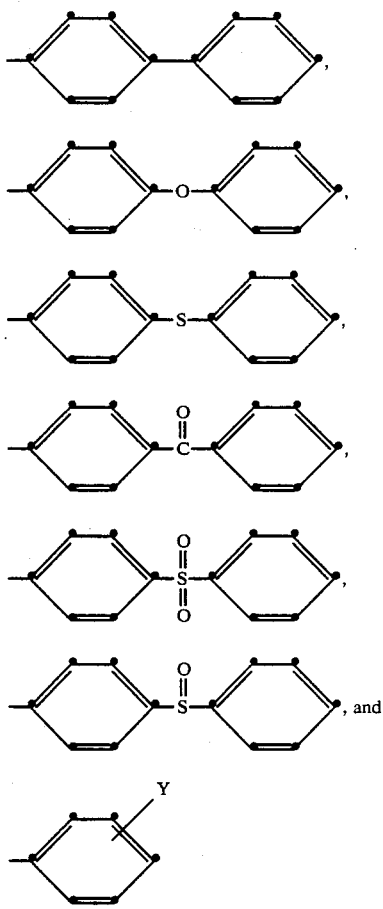

where Y is selected from the group consisting of —NO$_2$, —NH$_2$, —OR, and —COOR where R is alkyl from 1 to 4 carbons. The most preferred radical is

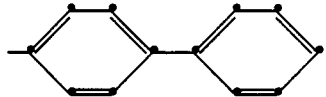

As will be understood by those skilled in the art, all of these radicals are contributed by the monoiodo analogue of the radical such as 4-iodobiphenyl ether and 4-iododiphenyl sulfone.

The amount of monoiodo aromatic compound used to contribute terminating radical T varies widely in accordance with the desired molecular weight of the copolymer. For very high molecular weight copolymers as little as one mole of monoiodo aromatic compound for each 1,000 moles or more of diiodo aromatic may be employed. If lower molecular weights are desired, the ratio of monoiodo aromatic compound to diiodo aromatic comPound can be as low as 1 to 10 or even 1 to 5. The monoiodo aromatic compound can be added at any convenient time during the polymerization but will generally is added at the start of the reaction as a matter of convenience.

As will be appreciated by those skilled in the art, use of the monoiodo aromatic compound results in termination of the chain at some predetermined average length, resulting in a more stable viscosity of the polymer in the melt. In general, the melt is considered to be stable if the melt viscosity change with time is less than a certain level. Measurement of this property is accomplished by determining the melt viscosity over a sufficiently long period of time, such as 35 minutes, and then Plotting the $-3\,4$ power of the melt viscosity versus time. The slope of the straight line fit to this curve is referred to as the degradation rate constant. Unterminated copoly(arylene sulfide) will generally have a degradation rate constant of a negative value times $10^{-4}$ or sometimes as low as a negative value times $5^{-5}$ whereas the terminated coPoly(arylene sulfide) of this invention will generally have a degradation rate constant of about $-4.0\times 10^{-5}$ as a maximum and more often will be about $-1.0\times 10^{-6}$ or even a Positive number. Values of the degradation rate constant on the order of $10^{-6}$ are sufficiently small to be considered equal to zero.

Sulfur is reacted as elemental sulfur and may consist of any of the standard forms which are possible for elemental sulfur. That is, the sulfur may be Present in any of its allotropic modifications such as orthorhombic cyclooctasulfur (S$_8$) or any other cyclic elemental sulfur such as any of the cyclosulfur sPecies having 6–12 sulfur atoms. Additionally, any crystalline form of sulfur may be used in the Present reaction. Surprisingly. impurities in the elemental sulfur do not aPPear to affect the efficiency or selectively of the present polymerization reaction. The sulfur Preferably has a purity of about 98%–100%, although sulfur having a lower degree of Purity may be used. This lack of sensitivity is advantageous to the Present process when used as a commerical process since highly purified sulfur is not required and the associated expense is not incurred.

In the process used to Prepare the co(polyarylene sulfide) of this invention sulfur reacts with a diiodo aromatic compound, eliminating elemental iodine and forming the PAS as shown below.

$$nArI_2 = nS \rightarrow (-Ar-S-)_n = nI_2$$

The formation of Polymer is not sensitive to the relative stoichiometry of the diiodo aromatic compound and sulfur. Accordingly, an excess of sulfur or an excess of diiodo aromatic comPound may be used in the polymerization Process. When excess sulfur is used, some disulfide linkages are observed in the Polymer. Decreasing amounts of sulfur result in decreasing levels of disulfide linkages in the final Polymer. When the diiodo aromatic compound is present in excess, polymerization to high polymer can still occur, if the excess diiodo aromatic compound is removed during final polymerization.

The Polymerization reaction is preferably carried out in the absence of solvent by merely heating and reacting the sulfur and diiodo aromatic compound. Under these conditions, the diiodo aromatic compound itself acts as a solvent for the sulfur which is melted thereby forming a substantially homogeneous solution enabling a facile and complete reaction.

In another embodiment, the diiodo aromatic compound can be dissolved in an organic solvent which is inert to the reaction conditions, i.e., which is inert to reaction with iodine and sulfur. High boiling inert aromatic solvents are Preferred such as, for example, aromatic hydrocarbons, diarylsulfides, diarylethers and diarylsulfones. It is Preferable to use a solvent which corresPonds to the diiodo aromatic comPound which is being polymerized. Thus, for examPle, in the polymerization of diiodobenzene with sulfur, one might use benzene, toluene or naPhthalene as a solvent.

It is also Possible to perform the polymerization reaction of the Present invention by solid state polymerization. Solid state polymerization enables very high molecular weights and melt viscosities to be achieved. After an initial melt polymerization (or alternatively solution polymerization) has been performed, the product is cooled to a solid state. Further heating and Polymerization in the solid state under vacuum or inert gas flow dramatically increases the molecular weight allowing weight average molecular weights in excess of 100,000 to be achieved. It is significant to note that substantially no crosslinking occurs during he solid state or melt polymerization processes The very high molecular weight copolymers which are Produced after the solid state polymerization are still substantially linear and have excellent film and fiber forming properties.

During the polymerization reaction between the diiodo aromatic compound, the monoiodo aromatic compound, and sulfur, elemental iodine is produced and evolves from the reaction melt. solution, or solid. Removal of the elemental iodine Provides a driving force for comPletion of the polymerization reaction. The iodine may be removed by passing a stream of air or an inert gas such as nitrogen or argon over or through the reaction mass at atmospheric or suPeratmospheric pressure or alternatively by aPplying a vaccum to the reaction apparatus. The elemental iodine may be collected and used as a commercial product or as a reactant for further chemical processes. The present reaction, therefore, does not result in wasted reaction products since both the PAS and elemental iodine are useful commercial chemical products.

The polymerization reaction is generally conducted at a temPerature above about 175° C. Although the reaction may be conducted at temperatures below 175° C., the polymerization reaction is much slower. There is no Particular upper temperature limit on the polymerization reaction, which may be conducted at any temperature below the decomposition temPerature of the diiodo aromatic compound. For most polymerization reactions, tempeatures in the range of about 175°-400° C. will be suitable, although for Particular diiodo aromatic compounds temperatures in excess of 400° C. may be used. Particularly Preferred temPerature ranges are from about 180°-350° C.

The reaction is generally conducted for a period of at least one-half hour and is continued for up to about 10 hours or longer, and reaction times approaching infinity are theoretically possible. The exact reaction time will depend on the diiodo aromatic comPound, the engineering requirements of the process, and the specific molecular weight, viscosity and Physical properties of the desired product.

The polymerization reaction may be carried out in a batch reaction vessel or may be carried out as a semicontinuous or continuous Process. Agitation of the reaction mixture is optional, however agitation or stirring assists in the production and yield of the Polymeric Product. Agitation of the reaction mixture may be accomPlished by any known method, such as mechanical stirring or by passing a stream of inert gas through the reaction mixture In a preferred embodiment, the Polymerization reaction is conducted on a continuous basis with the diiodo aromatic comPound and sulfur being combined in a continuous staged reactor to form a reaction melt. An inert gas such as nitrogen or argon is passed through the melt, preferably in a countercurrent direction, thereby accomplishing agitation and mixing of the reaction melt and at the same time removing the elemental iodine which is evolved and sweeping it out of the reactor. Alternatively, a vacuum may be applied to the reactor to remove the elemental iodine as it is generated. It should be noted that the reaction Proceeds equally well under batch conditions and combinations of batch and continuous processes are considered to be well within the scope of the present invention.

The terminated coPolymer of this invention is useful for Preparation of various shaPed articles such as pellets, fibers and molded articles. The copolymer can be prePared into these shaped articles by conventional Processes, such as injection molding and melt spinning.

Since there are no alkali metal containing materials in the reaction, there are no substantial quantities of alkali metal in the Polymer matrix. Typically, there is less than 100 weight parts per million alkali metal, Preferably less than 10 weight parts Per million, based on the weight of the copoly(arylene sulfide). The absence of substantial quantities of alkali metal greatly enhance the capability of the polymer to be melt processed, particularly melt spun into fibers.

The terminated copoly(arylene sulfide) and particularly the terminated copoly(phenylene sulfide) of this invention have an adjustable rate of crystallization, due to the Presence of the disulfide linkages. Since the concentrations of disulfide linkages can be varied over a wide range, the rate of crystallization can be readily adjusted to suit the technological apPlication without unduly sacrificing other desirable characteristics of the polymer. In addition, the rate of crystallization can be further enhanced by the addition of conventional nucleating aids such as talc, terephthalic acid, silica or the like for those aPPlications where extremely fast rates are desired.

An additional advantage of the terminated copolymer of this invention compared to the untermininated coPolymer disclosed in Serial Number 110,237 is that the terminated coPolymer is less corrosive to metals This is especially important when the coPolymer is used in electrical applications as well as where the copolymer is used for molded Parts, spinnerets for fiber spinning, or dies for film extrusion.

Other features of the invention will become apparent in the course of the following descriptions of exemplary embodiments which are given for illustration of the invention and are not intended to be limiting thereof.

EXAMPLES

The melt-phase polymerization reactions described in the examPles below were carried out in a stirred flask fitted with a vacuum-jacketed Vigreux column and a receiver cooled in dry ice. Fiber forming caPabilities of these Polymer were established by drawing strands from the polymer melt. Some polymers were tested to determine the value of x or the number of (—A—S—) units and (—A—S—S—) units in the polymer chain. In some cases the weight parts per million alkali metal and crystallization rate were determined.

The weight Parts per million alkali metal, based on the weight of the poly(arylene sulfide) were determined by atomic adsorPtion analysis.

The crystallization rate was determined by differential scanning colorimetry half-times or by comparing the Tcc and Tch for the Polymer in question to that of a polyPhenylene sulfide homoPolymer sold under the tradename of Ryton® PPS. All DSC analyses were run at 20° C./minute scan rate under $N_2$.

The degree of polymerization (n) was determined by measuring melt viscosity and applying the relationship $\log(n) = 1.473 + 0.2873 \times \log(\text{melt viscosity})$.

Melt viscosity was determined on a Rheometrics Mechanical Spectrometer (Model RMS-7220) at 300° C. and 25 radians/seconds All samples were predried in a vacuum oven and run under air.

The value of x for moderate values of x were determined by elemental analysis and calculation based on the excess sulfur present. For low values of x the values can be determined by digestion of the polymer by concentracted nitric acid, which oxidizes all disulfide linkages to sulfonic acid. Titration for sulfonic acid determines the amount of disulfide present.

EXAMPLE 1

This examPle illustrates the PreParation of the terminated poly(phenylene sulfide) of this invention and the limited melt-viscosity increase of the polymer when compared to the unterminated polymer.

In a 3-neck 500 mL round-bottom flask are combined the following: 38.00 g sulfur (1.19 mol), 410.0 g p-diiodobenzene (1.24 mol), 0.8 g of 1,3-diodo-5-nitrobenzene to act as polymerization catalyst, and 1.33 g (4.75 mmol) of 4-iodobiphenyl to act as a terminator. The flask is fitted with a Vigreux column for iodine takeoff, a mechanical stirrer, and the other neck is simply stoppered. The column is attached via a distillation head and takeoff tube to a receiver flask which is cooled in dry ice. The flask is maintained under ca. 200 torr pressure and immersed in a 230° C. metal bath. After melting, the melt is stirred mechanically. After ca. 30 to 45-minute reaction time, iodine begins to distill into the receiver flask. The bath is maintained at 230° C. for 2 hours and 30 minutes after which time the temperature is raised to 240° C. After holding there for an additional 1 hour and 30 minutes, the Pressure in the reaction flask is reduced to ca. 120 torr and held there for 0.5 hour. The Pressure is reduced again to ca. 60 torr, held there for an additional 0.5 hour, reduced again to ca. 30 torr, held there for an additional 0.5 hour, and finally the pressure is reduced to 0.1 torr by means of a vacuum PumP. At this final pressure reduction, the batch temperature is raised to 250° C. The reaction is held 1 hour and 5 minutes at this temperature and the bath temPerature then was raised to 300° C. for an additional 1-hour and 15-minute reaction time. After that time, the flask is removed from the bath. The Polymer melt is cooled under nitrogen, broken out of the flask, and granulated in a Wiley mill fitted with a 0.25 in screen. Yield is 115.2 g (90.0%) and the melt viscosity is 15675 poise at 300° C. Ten grams of the Polymer granules were placed in a solid-stating tube under 0.2 torr pressure and the tube placed in an aluminum block heated to 175° C. for 1.5 hours. The block was then raised to 210° C. After 12 hours the melt viscosity had only increased to 25023 Poise at 300° C. A similar copolymer not containing the terminating group exhibits a melt viscosity increase to 53500 poise. An additional preParation of a similar copolymer not containing the terminating group exhibits a melt viscosity increase to 111,000 poise.

EXAMPLE 2

This example further illustrates the beneficial effect of a terminator on the melt viscosity increase with time for poly(phenylene sulfide). The preparation aPParatus of ExamPle 1 is used except that the stoPPered neck was instead fitted with an inlet for an air sweep of 0.1 feet³/hour. Into two flasks were weighed the following reactants: 32 g sulfur (0.998 mol), 410.0 g p-diiodobenzene (1.24 mol, 24.5 mol% excess), and 0.8 g of 1,3 diiodo 5 nitrobenzene. Into Flask A was weighed 2.66 g (0.0095 mol) of 4 iodobiphenyl. Flask B had no terminator. The heating schedule employed was 2.5 hours at 230° C. at 200 torr Pressure followed by 1.5 hours at 240° C. after which the pressure was reduced to 120 torr for 0.5 hour followed by reduction to 60 torr for 0.5 hour and then reduction to 30 torr for 0.5 hour. The bath temperature was then raised to 250° C., the pressure reduced to 0.6 torr and the reactions held there for 1.5 hours. The isolated polymers were solid state Polymerized in tubes under a nitrogen sweep of 1.0 feet³/hour in a 240° C. heated block. The polymer from Flask A had an extrapolated zero-time melt viscosity of 144,700 Poise at 300° C. and a degradation rate constant of $-3.0 \times 10^6$. The melt viscosity was 142,300 Poise at the 5 minute test time and was 151,000 Poise after 35 minutes of test, i.e., essentially no change with time for the melt viscosity. The polymer from Flask B had an extrapolated zero-time melt viscosity of 56,400 poise at 300° C and a degradation rate constant of $-3.0$ of 56,400 Poise at 300° C. and a degradation rate constant of $-3.0 \times 10^{-4}$. Its viscosity at 5 minutes of testing was 51,200 Poise and increased to 144,100 Poise after 35 minutes of test or a considerable increase in the melt viscosity with time.

EXAMPLE 3

This examPle illustrates the less corrosive nature of the terminated Polymer in comParison to polymer that has not been terminated. Polymer was prepared essentially as in ExamPle 1 both with and without terminator. The unterminated samPle was not exposed to the final Polycondensation at 300° C. but was instead isolated at 250° C. Both samPles were ground and then 10 g of each were Placed in a solid state polymerization tube equipped with a flow of nitrogen at 1.0 ft³/hr. The tubes were Placed in a heated aluminum block held at 240° C. for the terminated sample and one held at 260° C. for the nonterminated samPle. After 24-hour treatment the polymers were removed and films pressed using a 20 mil thick shim. Pressing temperature was 300° to 325° C. A thin layer of copper metal was vapor deposited onto the films and the films stored at 93° C. for a week. The unterminated sample showed almost complete disaPPearance of the copper metal, while the terminated samPle apPeared to have little or no change.

We claim:

1. A copoly(arylene sulfide) corresponding to the structure

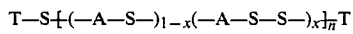

wherein A is a divalent substituted or unsubstituted aromatic radical, T is

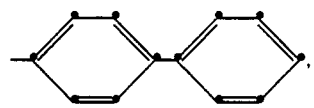

x is in the range of 0.5 to 0.001 n is at least 100.

2. The copoly(arylene sulfide) of claim 1 wherein n is at least 200.

3. The copoly(arylene sulfide) of claim 1 wherein the aromatic radical is selected from the group consisting of phenylene, biphenylene, diphenyl ether, diphenyl sulfone, benzophenone, diphenoxybenzene and naphthalene.

4. The copoly(arylene sulfide) of claim 3 wherein the aromatic radical is unsubstituted phenylene or unsubstituted biphenylene radical.

5. The copoly(arylene sulfide) of claim 4 wherein the aromatic radical is unsubstituted phenylene.

6. The copoly(arylene sulfide) of claim 1 wherein n is in the range of 200 to 5,000.

7. A copoly(phenylene sulfide) corresponding to the structure

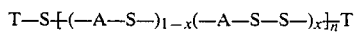

wherein A is a divalent unsubstituted phenylene radical, T is

x is in the range of 0.5 to 0.001, and n is in the range of 200 5,000.

* * * * *